W. DOERING.
BACK REST FOR MOTOR CYCLES, BICYCLES, &c.
APPLICATION FILED SEPT. 9, 1910.
998,330.
Patented July 18, 1911.
2 SHEETS—SHEET 1.
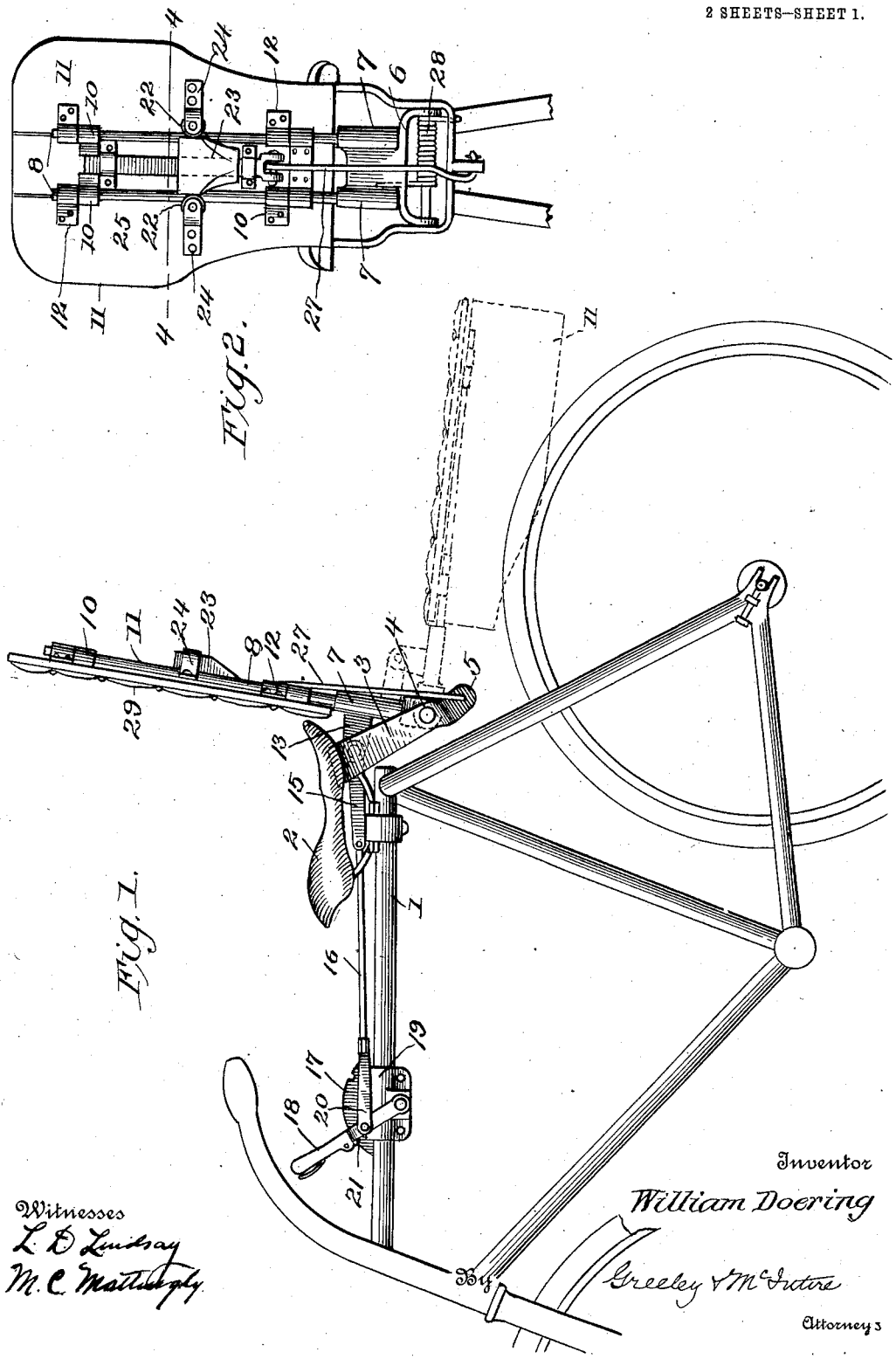
Witnesses
L. D. Lindsay
M. C. Mattingly
Inventor
William Doering
By Greeley & McIntire
Attorneys W. DOERING.
BACK REST FOR MOTOR CYCLES, BICYCLES, &c.
APPLICATION FILED SEPT. 9, 1910.
998,330.
Patented July 18, 1911.
2 SHEETS—SHEET 2.
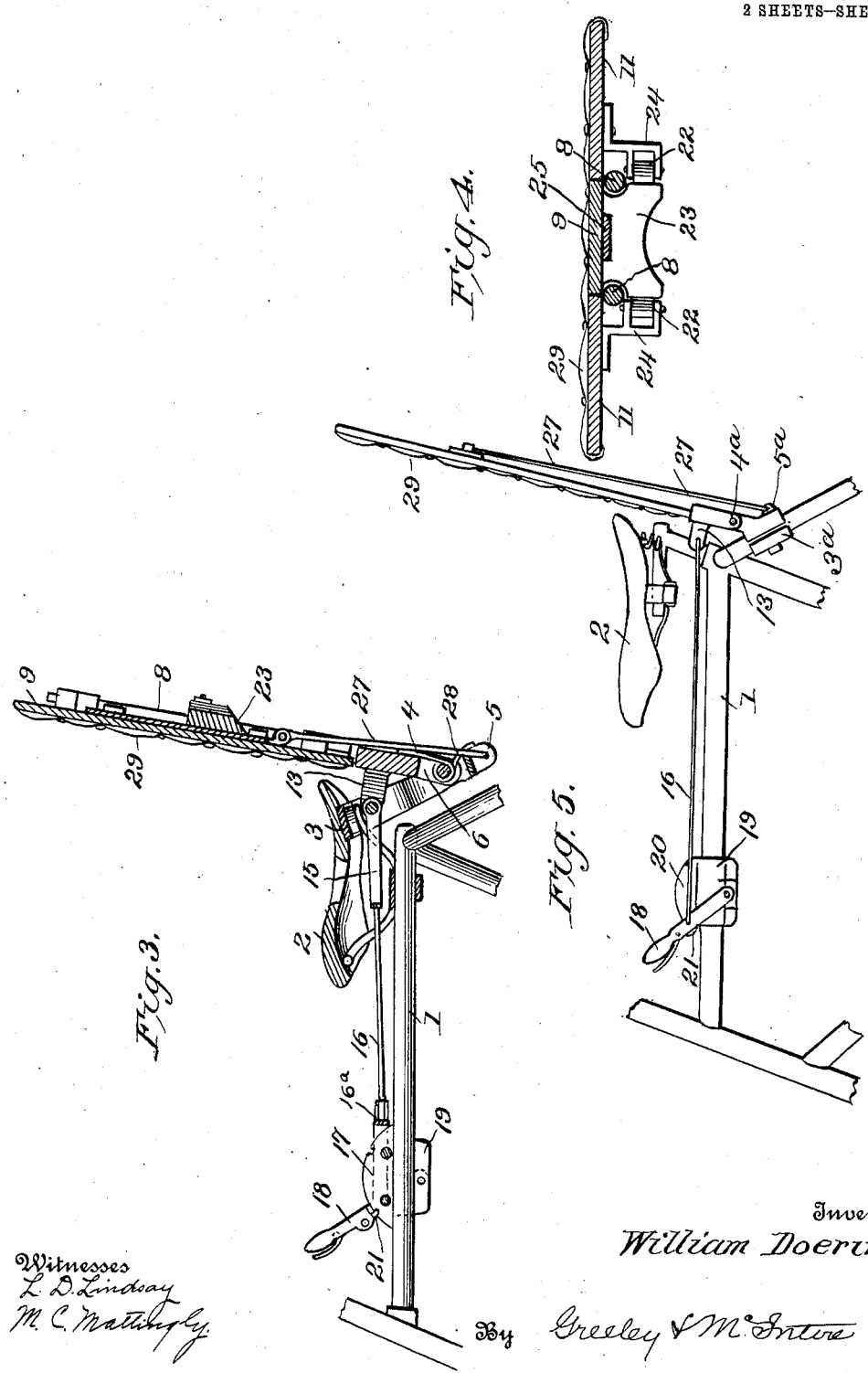
Witnesses
L. D. Lindsay
M. C. Mattingly
Inventor
William Doering
By Greeley & McIntire
Attorneys

UNITED STATES PATENT OFFICE.

WILLIAM DOERING, OF BALTIMORE, MARYLAND.

BACK-REST FOR MOTOR-CYCLES, BICYCLES, &c.

998,330.  Specification of Letters Patent.  Patented July 18, 1911.

Application filed September 9, 1910. Serial No. 581,293.

*To all whom it may concern:*

Be it known that I, WILLIAM DOERING, a citizen of the United States, residing at Baltimore, in the State of Maryland, have invented certain new and useful Improvements in Back-Rests for Motor-Cycles, Bicycles, &c.; and I do hereby declare the following to be a full, clear, and exact description of the invention, such as will enable others skilled in the art to which it appertains to make and use the same.

The present invention is in the nature of a back rest for motorcycles, bicycles, velocipedes, and the like, and the object of the invention is the provision of an improved device of this character which will give relief and comfort to persons riding great distances, and which embodies novel features of construction whereby it can readily be moved into and out of operative position.

The invention further contemplates the provision of a folding back rest which can be readily applied to a motorcycle or bicycle without interfering in any manner with the usual mechanism thereon, and which can be quickly manipulated without the necessity of dismounting from the machine in the case of an emergency.

A still further object of the invention is to provide a back rest which is strong and durable in its construction, which is positive and reliable in operation, and which can be manufactured and sold at a comparatively small cost.

With these and other objects in view, the invention consists in certain combinations and arrangements of the parts as will more fully appear as the description proceeds, the novel features thereof being pointed out in the appended claims.

For a full understanding of the invention, reference is to be had to the following description and accompanying drawings, in which:

Figure 1 is a side elevation of the improved back rest, the back being shown in a raised position by full lines and in a lowered position by dotted lines. Fig. 2 is a rear view of the back rest. Fig. 3 is a longitudinal sectional view through the device. Fig. 4 is a transverse sectional view, and Fig. 5 is a side elevation showing a slightly modified form of the invention.

Corresponding and like parts are referred to in the following description and indicated in all the views of the drawings by the same reference characters.

Referring to the drawings, the numeral 1 designates the frame of a motorcycle or bicycle, and 2 a conventional form of seat which is mounted thereon. A bracket 3 projects downwardly from the rear end of the seat 2, and in the present instance this bracket is shown as formed from a single bar of material, the middle portion of the bar being bolted or otherwise secured to the seat, while the end portions of the bar are bent downwardly to form the spaced arms which are connected by the pivot bolt 4, the extremities of the bar being brought together and extended downwardly to provide the finger 5 which projects downwardly from the bottom of the bracket. A swinging frame of some suitable construction is pivotally mounted upon the bolt 4, and as indicated upon the drawing, this frame comprises a fork 6 which is pivotally connected to the bolt 4 and is formed with the sockets 7 receiving the inner ends of a pair of spaced and parallel rods 8. The back piece 9 rests against the rods 8 and is secured thereto in some suitable manner as by means of the straps 10. Side wings 11 are located upon opposite sides of the back piece 9 and are shown as pivotally connected to the rods 8 by means of the straps 12. These wings 11 are swung outwardly into the plane of the back piece 9 when the back rest is moved upwardly into operative position, but hang from the rods 8 at the edges of the back piece when the device is in inoperative position.

A pair of arms 13 project upwardly from the pivot end of the swinging frame, and in the present instance these arms are shown as carried by the sockets 7 within which the inner ends of the rod 8 are fitted. A pin 14 connects the arms 13 and engages a yoke 15 at one end of a rod 16 which extends forwardly under the seat 2, the opposite end of the said rod being connected by means of a yoke 17 to an operating lever 18. This operating lever is located just in front of the seat 2 so as to be readily grasped by the rider, and is pivotally mounted upon a clamp 19 applied to the frame 1. This clamp 19 is provided with a rack 20 which is designed to be engaged by a suitable latch member 21 upon the operating lever for the purpose of enabling the back rest to be locked in an operative position. As will be readily apparent from the drawings, when the operating lever is moved forward the back rest is swung upwardly into operative position with respect to the seat 2, while when the operating lever is swung to the rear, the back rest is lowered into a position over the rear wheel.

Means is provided for automatically moving the wings 11 outwardly into the plane of the back piece 9 when the rest is swung upwardly, and for this purpose the side wings are provided with rollers 22 which engage opposite sides of a wedge shaped double faced cam member 23. The rollers are journaled upon suitable brackets 24, while the double cam member is carried by a slide 25 mounted within guides 26 upon the rear of the back piece 9, the inner end of the slide being connected by a link member 27 to the downwardly projecting finger 5 at the lower end of the bracket 3. When the swinging frame upon which the back piece 9 and wings 11 are mounted is swung upwardly, the link 27 draws the slide 25 inwardly and causes the cam 23 to engage the rollers 22 and wedge the same apart so as to move the wings 11 into the plane of the back piece 9. The said wings are retained in this position as long as the swinging frame remains in a raised position, but as soon as this swinging frame is lowered the slide 25 is again moved outwardly to admit of the wings 11 dropping into a pendent position upon each side of the rear wheel. It will thus be obvious that when it is desired to use the back rest, the rider has merely to grasp the operating lever 18 and move the same forwardly, the wings 11 being automatically swung outwardly at the same time when the back piece 9 is raised, while in order to move the back rest into inoperative position, it is merely necessary to release the latch member 21 from engagement with the rack 20 and draw the operating lever to the rear. For the purpose of counterbalancing the weight of the swinging frame and parts carried thereby and rendering it easier to operate the device through the medium of the lever, a coil spring 28 may be applied to the pivot bolt 4, one end of the coil spring engaging the bracket 3, while the opposite end of the coil spring engages the fork 6.

A slightly modified form of the invention is shown in Fig. 5, in which the swinging frame is pivotally mounted upon a pivot bolt $4^a$ connecting a pair of arms projecting from a bracket $3^a$ clamped upon the frame of the machine in any suitable position adjacent to the seat 2. The remainder of the device is identical with that previously described, with the exception that the link member 27 is connected to an ear $5^a$ at the lower end of the bracket $3^a$, instead of to the finger 5. It will also be understood that other means could be employed for mounting the back rest upon the frame of a motorcycle or bicycle without departing in any manner from the spirit of the invention. If found desirable, some form of padding such as that indicated at 29 could be applied to the back piece 9 and the wings 11. When this device is swung upwardly into operative position, it will form an effective rest for the back of the rider and will give material relief and comfort when traveling long distances. Attention may also be directed to the fact that the device is always under perfect control and can be very quickly moved either into or out of operative position without the necessity of stopping the machine or dismounting therefrom.

It will be apparent that the angle of the back rest may be adjustable to suit the convenience of the rider through the medium of the sleeve $16^a$ which has a threaded engagement with the rod 16. The back rest could also be hinged directly to the saddle, should such a construction be found desirable, and the back would then be prevented from projecting out any farther to the rear than it is necessary when it is down.

Having thus described the invention, what I claim as new and desire to secure by Letters Patent, is:—

1. In a back rest for motorcycles and the like, the combination of a bracket carried by the seat of the motor cycle, a swinging frame pivoted thereto, a back piece carried by the swinging frame, wings hinged to the sides of the back piece, means for manipulating the swinging frame and throwing the back piece into and out of operative position, and means for automatically swinging the wings outwardly into substantially the same plane with the back piece when the latter is moved into operative position.

2. In a back rest for motorcycles and the like, the combination of a bracket supported by the seat of the motor cycle, a swinging frame pivoted thereto, a back piece carried by the swinging frame, an operating lever, and connecting means between the operating lever and the swinging frame for manipulating the latter to move the back piece into and out of operative position.

3. In a back rest for motorcycles or the like, the combination of a bracket carried by the seat of the motorcycle, a swinging frame pivoted thereto, a back piece carried by the swinging frame, wings hinged to the side of the back piece and adapted to swing outwardly in substantially the same plane therewith, and means for manipulating the swinging frame to move the back piece into and out of operative position.

4. In a back rest for motorcycles and the like, the combination of a swinging frame, a back piece carried by the swinging frame, wings hinged to the sides of the back piece, means for automatically swinging the wings outwardly into substantially the same plane as the back piece when the said back piece is moved into operative position, an operating lever, and connecting means between the operating lever and the swinging frame for manipulating the latter to throw the back piece into and out of operative position.

5. In a back rest for motorcycles and the like, the combination of a swinging frame, a back piece carried by the swinging frame, wings hinged to the sides of the back piece, a slide upon the back piece, means actuated by the slide for swinging the wings outwardly into substantially the same plane as the back piece, and means for manipulating the swinging frame.

6. In a back rest for motorcycles and the like, the combination of a swinging frame, a back piece carried by the swinging frame, wings hinged to the sides of the back piece, a slide mounted upon the back piece, a cam carried by the slide, means upon the wings for coöperation with the cam to swing the wings outwardly into substantially the same plane with the back piece, and means for manipulating the swinging frame.

7. In a back rest for motorcycles and the like, the combination of a swinging frame, a back piece carried by the swinging frame, means for manipulating the swinging frame to move the back piece into and out of operative position, a slide mounted upon the back piece, wings hinged to the sides of the back piece, and means actuated by the slide for automatically swinging the wings outwardly into substantially the same plane as the back piece when the back piece is moved into operative position.

8. In a back rest for motorcycles and the like, the combination of a swinging frame, a back piece applied to the swinging frame, means for manipulating the swinging frame to move the back piece into and out of operative position, wings hinged to the sides of the back piece, a movably mounted cam carried by the back piece, and means upon the wings for coöperation with the cam to swing the wings outwardly into substantially the same plane as the back piece when the said back piece is moved into operative position.

9. In a back rest for motorcycles and the like, the combination of a swinging frame, a back piece applied to the swinging frame, means for manipulating the swinging frame to move the back piece into and out of operative position, wings hinged to the sides of the back piece, and rollers carried by the wings for coöperation with the cam to automatically swing the wings outwardly into substantially the same plane as the back piece when the said back piece is moved into operative position.

10. In a back rest for motorcycles and the like, the combination of a bracket adapted to be applied to the motorcycle, a swinging frame mounted upon the bracket, a back piece applied to the swinging frame, a hinged wing at each side of the back piece, means for swinging the wings outwardly into substantially the same plane as the back piece, a clamp adapted to be applied to the frame of the motorcycle, a lever mounted upon the clamp, and connecting means between the lever and the swinging frame for moving the latter to throw the back piece into and out of operative position.

11. In a back rest for motorcycles and the like, the combination of a bracket adapted to be applied to the frame of the motorcycle and formed with a finger, a swinging frame mounted upon the bracket, a back piece applied to the swinging frame, a hinged wing at each side of the back piece, a slide mounted upon the back piece, means for manipulating the swinging frame to throw the back piece into and out of operative position, a link connecting the slide to the before mentioned finger upon the bracket for moving the slide upon the back piece when the swinging frame is manipulated, and means coöperating with the slide for automatically moving the wings outwardly into substantially the plane of the back piece when the latter is moved into operative position.

12. In a back rest for motorcycles and the like, the combination of a swinging frame, means for manipulating the swinging frame, a back piece carried by the swinging frame, a hinged wing at each side of the back piece, a slide mounted upon the back piece, a link connecting the slide to an immovable part upon the motorcycle for moving the slide when the swinging frame is turned about its pivot, and means coöperating with the slide for automatically swinging the wings outwardly into substantially the same plane as the back piece when the said back piece is moved upwardly into operative position.

13. In a back rest for motorcycles and the like, the combination of a back piece, means for mounting the back piece upon the seat of a motorcycle, a hinged wing at each side of the back piece, and means for holding the hinged wings in operative position.

14. In a back rest for motorcycles and the like, the combination of a back piece, means for mounting the back piece upon a motorcycle, a hinged wing at each side of the back piece, a movable cam mounted upon the back piece, and means carried by the wings for coöperation with the movable cam to hold the wings in operative position or permit them to hang in inoperative position.

15. In a back rest for motorcycles and the like, the combination of a back piece, means for mounting the back piece upon the motor cycle, folding extensions for the back piece, means for moving the back piece into and out of operative position, and means for automatically moving the extensions simultaneously into operative position with the back.

In testimony whereof I affix my signature in presence of two witnesses.

WILLIAM DOERING.

Witnesses:
  LOUISE MARTIN,
  CHAS. H. MCCAULEY.

Copies of this patent may be obtained for five cents each, by addressing the "Commissioner of Patents, Washington, D. C."